US006320108B1

(12) United States Patent
Worlitzsch

(10) Patent No.: US 6,320,108 B1
(45) Date of Patent: Nov. 20, 2001

(54) STRING INSTRUMENT

(76) Inventor: Volker Worlitzsch, An der Schachtbahn 4, 29313 Hammbühren (DE)

( * ) Notice: Subject to any disclaimer, the term of this patent is extended or adjusted under 35 U.S.C. 154(b) by 0 days.

(21) Appl. No.: 09/517,499

(22) Filed: Mar. 2, 2000

(30) Foreign Application Priority Data

Mar. 6, 1999 (DE) .......................................... 299 04 075 U

(51) Int. Cl.[7] .......................................... G01D 1/08
(52) U.S. Cl. .......................................... 84/267; 84/297 R
(58) Field of Search .......................................... 84/267, 297 R, 84/290, 297 S

(56) References Cited

U.S. PATENT DOCUMENTS 4,335,641 * 6/1982 Hopf .......................................... 84/297 R
5,519,165 * 5/1996 Gregory .......................................... 84/293
5,522,299 * 6/1996 Rose .......................................... 84/314 N
6,069,306 * 5/2000 Isvan et al. .......................................... 84/267
6,087,569 * 7/2000 Gottschall .......................................... 84/291

* cited by examiner

*Primary Examiner*—Robert E. Nappi
*Assistant Examiner*—Kim Lockett
(74) *Attorney, Agent, or Firm*—Pendorf & Cutliff

(57) ABSTRACT

A string instrument with one or more synthetic strings. The instrument includes (a) a tailpiece with at least one contact ridge and (b) a bridge spaced apart from the tailpiece. The synthetic string includes a conventionally not played, freely oscillating string segment between the contact ridge of the tailpiece and the bridge. The entire segment between the contact ridge of the tailpiece and the bridge has a uniform construction and a substantially constant diameter.

8 Claims, 1 Drawing Sheet

STRING INSTRUMENT

BACKGROUND OF THE INVENTION

1. Field of the invention

The present invention concerns a string instrument with one or more synthetic strings, including (a) a tailpiece with at least one string contact part as well as (b) an instrument bridge (in the following referred to as "bridge") spaced apart therefrom, defining between the tailpiece and the bridge a conventionally not played, freely oscillating string segment.

The term "synthetic string" includes herein for example (a) a string of metallic wire and (b) a string with a core of natural cat gut, metal, or plastic with a slender thread (for example of a metal such as silver, aluminum, or titanium) tightly and evenly wound about it as well as (c) other conventional strings. Not included in the term "synthetic string" —and excluded from group (c)—is natural cat gut with or without textile wrapping and with or without chemically treated string outer surfaces.

The "synthetic string" includes in certain cases also a textile wrapping, which covers a segment of the string (in particular at its ends); string and textile wrapping in this case together form the "synthetic string".

SUMMARY OF THE INVENTION

The invention in particular concerns string instruments such as the violin, the viola, the cello, and the double bass.

It was the task of the present invention to design a string instrument of the above-described type such that—after tuning of the instrument—a particularly pure sound is achievable. Although string instruments have been known for centuries, it is now as before not only the playing of the instrument, but rather also the manufacture of the instrument itself, that remains an art. The establishment of clear rules for improvement of the sound of an instrument is thus of interest to both the musician as well as the instrument maker.

The invention is based on the recognition, that the sound of the string instrument of the above-described type, that is, for example, the sound of a violin, a viola, a cello, or a double bass, is always determined in part by the string segment which is conventionally not played, that is, by the freely oscillating string segment between the tailpiece and the wooden bridge of the instrument in the area of the F-holes. This string section, and its effects upon the overall sound of the instrument, were however generally overlooked until now.

It has now been discovered as a result of the inventor's own research that a particularly good overall tone is produced when in a string instrument of the above-described type at least one synthetic string (preferably, however, all strings) over the entire segment between the string contact part of the tailpiece and the bridge possesses (possess) a uniform construction and a substantially constant diameter. A uniform construction and an essentially constant string diameter is present for example in a segment of a conventional synthetic string of the above-described type, wherein a core of cat gut, metal, or plastic is wrapped about by a thin thread (which is much thinner than the core) tightly and evenly, so that the outer string diameter is constant at every winding and adjacent windings abut each other.

Until now, no string instrument was known, in which a synthetic string was used of which the entire segment between the string contact part of the tailpiece and the bridge a uniform construction and a substantially constant diameter of this string was maintained.

This lies above all therein that the ends of conventional synthetic strings which is associated with the tailpiece are designed to be loop or pear shaped, wherein the free end of each one of the strings is looped back around, brought into contact with a section of the string a few centimeters before the loop, and secured thereto by wrapping around with a textile band. As a result, when in the tensioned condition parts of the textile wrapping are in the segment between the string contact part of the tailpiece and the bridge. A synthetic string segment of this type, which segment-wise is not comprised of a single string strand but rather comprises a doubled string strand and an associated wrapping with a textile material, obviously possesses neither a uniform construction nor a constant diameter. This non-uniformity results—as has now been determined—in a side note when the instrument is played which for the layman is hardly noticeable, but however for the educated ear is disturbing. After tuning the played area between the upper saddle and the bridge in a string instrument having synthetic strings of the type described in the above background section, there may result a purely coincidental tuning of the non-uniform unplayed area between the string contact part of the tailpiece and the bridge.

It was already been attempted to improve the sound purity of a string instrument by providing for each string respectively, in the area of the tailpiece, a slideable mounting saddle (with respectively one support part), in order to vary the length of the unplayed area. This approach was also based upon the recognition that the conventionally not played string segment has an effect upon the total tone of a string instrument. It overlooked, however, that in the case of the employment of synthetic strings the said wrapping of the string with a textile material has a disturbing influence. As a result, a tone modulation was attempted (and also achieved) by means of comparatively complex mechanical devices, while the present inventive approach to the improvement of the tone was overlooked. The present inventive solution produces, just as the described mechanical device, a harmonization of the total sound and it is in this respect even superior in the tone purity.

According to a preferred design of the inventive string instrument at least one slideable contact ridge is supplementally provided, such that the length of the free oscillating string segment between this contact ridge and the bridge can be varied. In this manner it becomes possible not only to achieve particularly pure sounds, but rather also the sound of a string can be modulated in desired manner. The person of ordinary skill would be enabled to produce such a variable contact ridge by the exemplary embodiments disclosed for example in Petty Patent DE 297 12 635.

In an inventive string instrument means are typically provided in order to span two or more synthetic strings over the segment between the bridge and a single, in certain cases slideable, contact ridge of the string holder, wherein the bridge and the individual contact ridge of the tailpiece run essentially parallel. The spanning means typically include one peg per string (for tensioning the string) and one string-fixing element, which is associated with the tailpiece. The string-fixing element is comprised in the normal case of a recess or an opening in the tailpiece, which in the tensioned condition of the instrument works together with a securing element on the synthetic string (see the following figures and associated text).

As already described above, the invention particularly concerns violins, violas, cellos, as well as double basses, and thus typically four or more strings are provided in an inventive string instrument, wherein one tone is naturally associated with which of the respective free oscillating segments between the bridge and the respective contact ridge of the tailpiece. These tones (four or more) preferably form intervals, which correspond to the intervals of the played area of the strings on the other side of the bridge. If, for example, a violin constructed in accordance with the invention is tuned to fifths, that is, if the tones of two adjacent strings in the freely oscillating played segments form an interval of five diatonic tone steps, so also the interval between the corresponding freely oscillating unplayed segments between the bridge and the contact ridge of the tailpiece form a fifth, wherein the respective tone depends upon the length of the unplayed segment. The same applies of course also in the case of tuning of the instrument to fourths or sixths, etc.

Since the present invention is based upon the recognition that the sound of the string instrument depends also in part upon the conventionally not played string segment, it is understood that an inventive string instrument is preferably so designed, that it has on its end opposite to the tailpiece an upper saddle as well as at least one peg for tensioning the (at least one) synthetic string, wherein this synthetic string also in the entire section between upper saddle and peg, that is, in the non-contacting areas within the peg box, a uniform construction and an essentially constant diameter. In the case that multiple strings are provided, such as for in the case of a violin, then the foregoing preferably applies for all strings.

The invention concerns, besides the inventive string instrument, also a suitable synthetic string for a string instrument which includes a bridge and a tailpiece with contact ridge, wherein the string has a segment with a uniform construction and an essentially constant diameter, and wherein the string has on its end a connecting means for securing that end to the tailpiece, which connecting means has a greater breadth than the said segment. In the inventive synthetic string, the segment of uniform construction begins at a distance from the securing means, which distance is less than the conventional distance between the securing means and the synthetic string contact area of the tailpiece for the particular string instrument.

The securing means includes, as a rule, a ball-shaped thickening or a loop.

BRIEF DESCRIPTION OF THE DRAWINGS

A preferred embodiment of the inventive synthetic string and an inventive string instrument is described in greater detail in the following on the basis of the figures. There is shown.

DETAILED DESCRIPTION OF THE INVENTION

Figure 1:
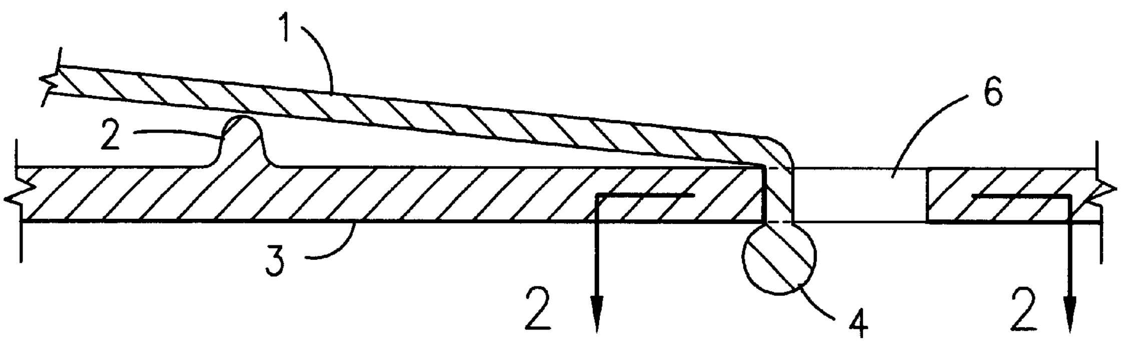
FIG. 1: A simplified schematic cross section through a tail piece and a string of an inventive string instrument as well as FIG. 2: A longitudinal section along the dashed line in the direction of view of the arrow A—A of FIG. 1
Figure 2:
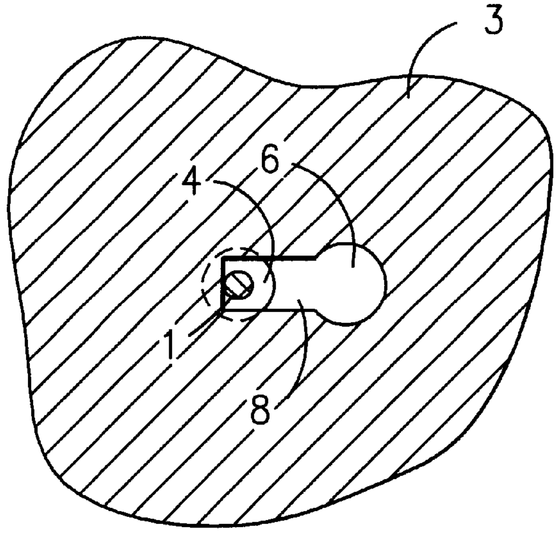

In FIGS. 1 and 2, a segment of an inventive string instrument with a synthetic string 1 is shown.

In FIG. 1, it is shown that the synthetic string 1 is secured to the tailpiece 3. The synthetic string 1 begins with a ball-shaped securing means 4, which is inserted in an arresting position below the tailpiece 3 (see FIG. 2) and beginning therefrom extends upwards through a constriction 6 in the tailpiece 3, and at the upper surface of the tailpiece bends in the direction towards a contact ridge 2 of the tailpiece 3.

The synthetic string 1, which in a not-shown manner is connected with the ball-shaped thickening 4, is in comparison to the conventional synthetic strings on no part wrapped about with a textile band, so that the total represented area of the synthetic string has a uniform construction and a substantially constant diameter. Herein it is only essential for the invention that the synthetic string 1 of the string instrument in the area between the contact ridge 2 of the tailpiece 3 and the bridge, the bridge not being shown but in FIG. 1 positioned to the left, has a uniform construction and a substantially constant diameter. In the area between the contact ridge 2 and securing means 4 there could thus be provided, as conventional, a textile wrapping.

In FIG. 2 a cross section along the dashed line viewed in the direction of arrow A—A in FIG. 1 is shown. One can see that the opening 6 in the tailpiece (a) includes an approximately circular-shaped area through which the ball-shaped thickening 4 of the synthetic string 1 can be introduced, and (b) possesses a slit-shaped section 8, which extends in the direction towards the contact ridge 2 and of which the breadth is intermediate between the breadth of the ball-shaped thickening 4 and the breadth of the thereto connected constant diameter synthetic string segment.

In the tensioned condition of the string instrument, the synthetic string 1 is tensioned, so that the thickening 4 lies lodged tightly against the underside of the tailpiece and the synthetic string 1 as a consequence cannot be freed its engagement with the opening 6.

The distance between the ball-shaped thickening 4 and the contact ridge 2 of the tailpiece 3 in conventional violins is approximately 7 mm, so that an optionally present textile wrapping may, extend beginning from the ball-shaped thickening, not farther than 7 mm in the direction of the contact ridge 2. Respective conventional dimensions are known for other string instruments of the above-described field, from which the respective maximal coverage of the optionally present textile wrapping can be determined.

What is claimed is:

1. A String instrument with one or more synthetic strings, including:

(a) a body;

(b) a neck affixed to the body at one end;

(c) a tailpiece on the body, the tailpiece is located opposite to the neck; wherein the tailpiece includes at least one contact ridge; and (d) a bridge on the body spaced apart from the tailpiece;

wherein said synthetic string includes a first end, a second end, and a segment with a uniform construction and a constant diameter;

wherein the segment includes an unplayed, freely oscillating string segment between the contact ridge of the tailpiece and the bridge, and wherein the entire segment between the contact ridge (2) of the tailpiece (3) and the bridge has a uniform construction and a constant diameter.

2. A String instrument according to claim 1, wherein at least one contact ridge is provided to be adjustable such that the length of segment between this contact ridge and the instrument bridge can be varied.

3. A String instrument according to claim 1, wherein the neck comprises an upper saddle and at least one peg for holding the synthetic string, wherein the synthetic string in the entire segment between the upper saddle and the peg possesses a uniform construction and a substantially constant diameter.

4. A String instrument with one or more synthetic strings, including:

(a) a body;

(b) a neck affixed to the body at one end;

(c) a tailpiece on the body, the tailpiece is located opposite to the neck; wherein the tailpiece includes at least one contact ridge; and (d) a bridge on the body spaced apart from the tailpiece; wherein said synthetic string includes a first end, a second end, and a segment with a uniform construction and a constant diameter;

wherein the segment includes an unplayed, freely oscillating string segment between the contact ridge of the tailpiece and the bridge, and wherein the entire segment between the contact ridge (2) of the tailpiece (3) and the bridge has a uniform construction and a constant diameter;

wherein four or more strings are provided, of which the free oscillating segments between the instrument bridge and the respective contact ridges of the tailpiece are respectively associated with one note, wherein these notes form intervals which correspond to the intervals in the played areas of the strings on the other side of the instrument bridge.

5. A Synthetic string for a string instrument, which instrument includes:

(a) a body;

(b) a neck affixed to the body at one end;

(c) a tailpiece on the body, the tailpiece is located opposite to the neck; wherein the tailpiece includes at least one contact ridge; and (d) a bridge on the body spaced apart from the tailpiece; an instrument bridge and a tailpiece having a contact ridge, wherein the string includes a first end, a second end and a segment with a uniform composition and a constant diameter, wherein the string on the second end is provided with connecting means for securing the string to the tailpiece; the connecting means having a greater breadth than said string segment, and wherein the uniform and constant segment begins at a distance from the connecting means (4) which distance is smaller than the distance from the connecting means to the area in which the synthetic string lies upon the contact ridge of the tailpiece for that instrument.

6. A Synthetic string according to claim 5, wherein the connecting means (4) is a ball-shaped enlargement.

7. A Synthetic string according to claim 5, wherein the connecting means (4) is a loop.

8. A String instrument with one or more synthetic strings, including:

(a) a body;

(b) a neck affixed to the body at one end;

(c) a tailpiece on the body, the tailpiece is located opposite to the neck; wherein the tailpiece includes at least one contact ridge; and (d) a bridge on the body spaced apart from the tailpiece; wherein said synthetic string includes a first end, a second end, and a segment with a uniform construction and a constant diameter;

wherein the segment includes an unplayed, freely oscillating string segment between the contact ridge of the tailpiece and the bridge, and wherein the entire segment between the contact ridge (2) of the tailpiece (3) and the bridge has a uniform construction and a constant diameter;

wherein the string instrument is selected from the group consisting of violin, viola, cello and double bass.

* * * * *